May 20, 1924.
M. SPUHR
STEAM AND WATER SEPARATOR
Filed Aug. 30, 1920
1,494,387
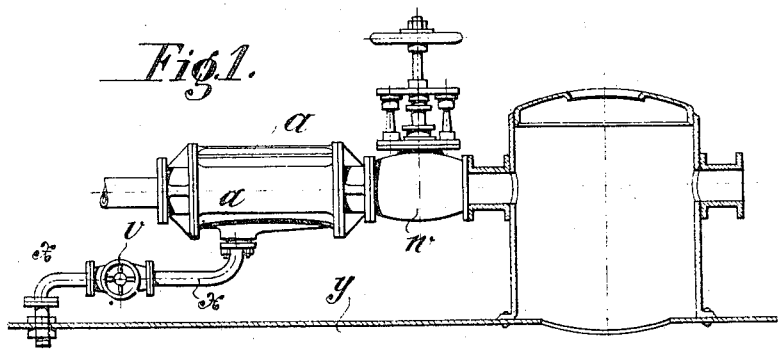
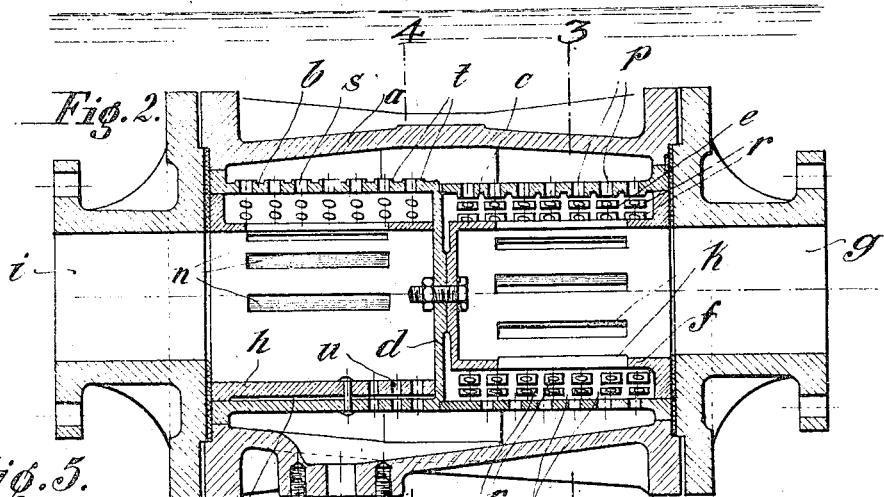
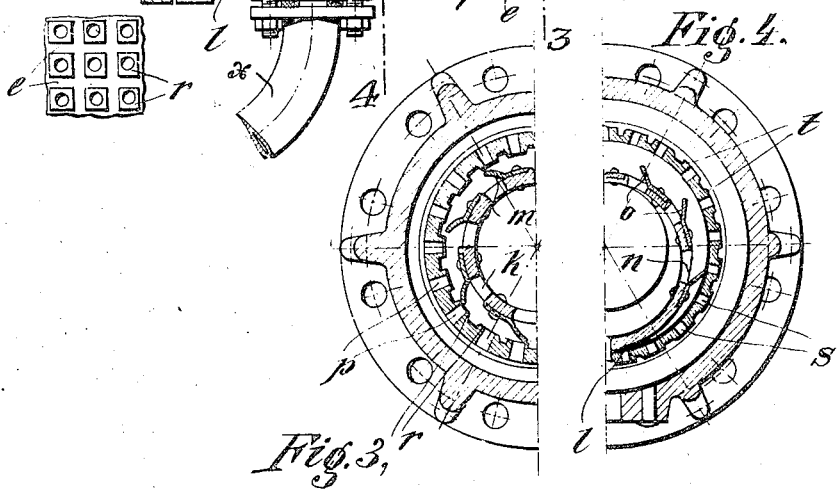
Inventor:
Max Spuhr Patented May 20, 1924.

1,494,387

UNITED STATES PATENT OFFICE.

MAX SPUHR, OF WERDEN-RUHR, GERMANY.

STEAM AND WATER SEPARATOR.

Application filed August 30, 1920. Serial No. 407,068.

*To all whom it may concern:*

Be it known that I, MAX SPUHR, a citizen of the German Republic, and residing at Werden-Ruhr, Germany, have invented certain new and useful Improvements in Steam and Water Separators (for which I have filed applications in Germany, January 9, 1915, Patent No. 293,551; Germany, September 29, 1919, Patent No. 341,315; and Switzerland, February 22, 1918, Patent No. 78,326), of which the following is a specification.

The present invention has reference to steam and water separators and relates more specifically to an improved design of separator to be used, for instance, in connection with a steam boiler for depriving live steam of its moisture and for directly reconducting such recovered moisture back into the boiler, which separator includes means for forcing the steam to follow a tortuous path in the course of which the flow medium is repeatedly subjected to intense eddying and swirling deflections and is passed over variously disposed rubbing surfaces for enhancing the separation of the water particles, until the steam finally passes to the place of consumption in practically dehydrated state, the condensate being recon-ducted into the boiler.

In order to make my invention more readily understood I will now describe it in detail in connection with the accompanying sheet of drawings, in which Fig. 1 is a side view of the separator mounted on a fragmentally and sectionally shown boiler; Fig. 2 is a longitudinal section through the separator proper, on an enlarged scale; Fig. 3 is a half-section on line 3—3, and Fig. 4 a similar half-section on line 4—4 of Fig. 2. Fig. 5 represents a fragmentary detail of the guttered rubbing surface of the separator chambers.

The device is shown mounted on a boiler $y$, its intake end communicating with the steam dome thereof and the outlet for the condensate communicating with the steam space of the boiler, and the outlet for the dry steam communicating with a superheater, an engine, or the like. Valves $w$ and $v$ are interposed between the separator and the respective boiler parts.

Within the separator shell or case $a$ are substantially coaxially disposed cylinders $b$ and $c$, which by the interposition of the common partition wall $d$ are formed into two chambers closed at their inner ends and open at their outer ends. The chamber $c$ houses a cylinder or cup member $f$ (Fig. 2) concentric with and spaced from the chamber wall, whilst within the chamber $b$ a cylinder $h$ is eccentrically arranged in such manner that it is in relatively close contact with the chamber $b$ along its lower portion, with a narrow space $l$ between, whilst it is spaced apart therefrom to a relatively large extent along its upper portion. The cup $f$ is open toward the intake fitting $g$, and the cylinder $h$ is open toward the other end fitting $i$. The cup $f$ is provided in its circumferential wall with longitudinal slots $k$ from which extend outwardly directed tongues or wings $m$ (Fig. 3) curving over these slots. The eccentric cylinder $h$ shows similar slots $n$ and outwardly extending tongues $o$ (Fig. 4). These slots $n$ and tongues $o$, however, are provided only in the upper half of the cylinder (left half of Fig. 2). The outer chamber $c$ is provided in its circumference with radially directed perforations $p$ the inner ends of which are surrounded by square projections $r$ (Fig. 5) which form between them longitudinally and circumferentially intersecting gutters $e$. Similar perforations $s$ and gutter forming projections $t$, on the other ends of the perforations, are provided over practically the entire circumference of the chamber $b$ with the exception of the lowermost portion, where the cylinders $b$ and $h$ contact and where a series of registering drain passages $u$ are provided. Similar drain passages are provided in the lowermost part of the cylinder $c$.

The steam from the boiler dome passes through valve $w$ and fitting $g$ into the cylinder $f$ and out thereof through slots $k$ into the space between the two concentrically nested cylinders $f$ and $c$ and in so doing is deflected by the tongues $m$ and caused to whirl and eddy whilst rubbingly passing over the inner projections $r$ of chamber $c$, which causes separation of steam and entrained water particles. The separated water runs down the circumferential gutters $e$, passes through the bottom perforations in chamber $c$ into the depressed bottom part of case $a$ and out thereof through the outlet pipe $x$. The steam flows outwardly through the perforations $p$ into the space formed between the wall of chamber $c$ and case $a$ and then in inwardly passing through the perforations s in chamber b rubbingly contacts with the projections t thereof, when still more water particles are separated out, which flow down the outer circumferential gutters e into the bottom space l and out through the drain passages u into the case bottom and finally into the outlet pipe x. The steam passing inwardly through the slots n is again abruptly swirlingly deflected by the tongues o for depriving it of the remainder of its moisture content, which moisture also runs off through the passages u. The thus thoroughly dehydrated steam finally passes through the end fitting i to a superheater, an engine, or other destination.

What I claim is:—

1. In a steam and water separator of the character set forth, in combination, a case including end fittings and a drain-off, an open-ended multi-perforated cylinder spacedly concentrically supported in said case, a cross-partition wall in said cylinder dividing the latter into two non-communicating chambers, an apertured cylinder spacedly concentrically supported in one of said perforated cylinder chambers, and an apertured cylinder eccentrically supported in the other cylinder chamber with its lower longitudinal portion in relatively close proximity to the respective bottom portion of the housing cylinder chamber.

2. In a steam and water separator of the character set forth, in combination, a case, end fittings thereon and a drain-off in the bottom of said case, steam dehydrating means in said case, comprising coaxially arranged, partition-divided, oppositely outwardly opening chambers having peripheral perforations and bottom drain passages, and rubbing projections surrounding said perforations and forming gutters, these projections being located on the inside of the one of said cylinders and on the outside of the other cylinder, and an inner cylinder spacedly supported in each of said chambers and each having longitudinal slots, and steam deflecting means on said inner cylinders cooperating with said slots and said chamber perforations, for the purpose of causing the steam to follow a tortuous and disturbed course for thoroughly depriving it of its moisture.

3. In a steam and water separator of the character set forth, in combination, a case with end fittings and a drain-off in its bottom part, a two-part chamber structure spacedly concentrically disposed in said case, comprising two relatively coaxially supported outer cylinders having radially directed wall perforations and a plurality of bottom drain passages, an inner partition wall between the said two outer cylinders; rubbing projections respectively surrounding said radial cylinder perforations on the inside of the one and on the outside of the other of said outer cylinders; an inner cylinder concentrically supported in one of said outer cylinders, having longitudinal slots and bottom drain passages, and deflectors on said inner cylinder member co-operating with said slots, and a second inner cylinder eccentrically supported in the other outer cylinder and having drain passages in its lowermost portion for registry with said bottom drain passages in the respective outer cylinder, and having also longitudinal slots, and deflectors cooperating with these latter slots.

4. In a steam and water separator of the character set forth, in combination, a case with end fittings and a drain-off in its bottom part, a two-part chamber structure spacedly concentrically supported in said case, comprising two relatively coaxially supported outer cylinders having radially directed wall perforations and a plurality of bottom drain passages, an inner partition wall between the said two outer cylinders; rubbing projections respectively surrounding said radial cylinder perforations on the inside of the one and on the outside of the other of said outer cylinders; an inner cylinder concentrically supported in one of said outer cylinders, having longitudinal slots and bottom drain passages, and deflectors on said inner concentric cylinder member cooperating with said slots, said deflectors curvingly extending from one of the longitudinal edges of the said slots to near the inner circumference of the respective outer cylinder and practically overhanging the entire width of the respective slots; and a second inner cylinder eccentrically supported in the other outer cylinder and having drain passages in its lowermost portion for registry with said bottom drain passages in the respective outer cylinder, and having longitudinal slots provided in its upper portion only, and straight deflectors on said inner eccentric cylinder member cooperating with said slots thereof, said straight deflectors progressively ending nearer to the respective outer cylinder as the inner, relatively eccentrically mounted cylinder approaches more and more the outer cylinder at its lower portion.

In testimony whereof I affix my signature.

MAX SPUHR.